(12) United States Patent
Borland

(10) Patent No.: US 6,320,943 B1
(45) Date of Patent: Nov. 20, 2001

(54) ELECTRONIC DIRECTORY SYSTEM AND METHOD

(75) Inventor: David James Borland, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 08/874,004

(22) Filed: Jun. 12, 1997

(51) Int. Cl.[7] .................................................. H04M 15/00
(52) U.S. Cl. ............................. 379/112.01; 379/142.01; 379/142.17; 379/93.23; 455/566
(58) Field of Search .................... 379/111–114, 117–118, 379/120, 127, 133–134, 142, 156, 177, 216, 355–356; 397/211, 201; 455/73, 566, 567, 575

(56) References Cited

U.S. PATENT DOCUMENTS

| | | | | |
|---|---|---|---|---|
| 4,924,496 | * | 5/1990 | Figa et al. | 379/142 |
| 5,398,279 | * | 3/1995 | Frain | 379/140 |
| 5,592,546 | * | 1/1997 | Takahashi | 379/355 |
| 5,602,908 | * | 2/1997 | Fan | 379/142 |
| 5,734,706 | * | 3/1998 | Windsor et al. | 379/142 |
| 5,749,052 | * | 5/1998 | Hidem et al. | 455/406 |
| 5,754,636 | * | 5/1998 | Bayless et al. | 379/142 |
| 5,850,433 | * | 12/1998 | Rondeau | 379/201 |
| 6,004,276 | * | 12/1999 | Wright et al. | |

OTHER PUBLICATIONS

Am79C410A CT2 PhoX™ Controller for Digital Cordless Telephones, Technical Manual, Advanced Micro Devices, pp. 1–1 to 7–3(Rev. 3, 1995).

Am79C412 CT2 PhoX™ Controller for Digital Cordless Telephones, Technical Manual, Advanced Micro Devices, pp. 1–1 to 7–3 (© 1995 Advanced Micro Devices, Inc.).

Am79C432 ISM Phox™ Controller for Digital Cordless Telephones, Technical Manual, AMD, pp. 1–1 to 7–3 (©1996 Advanced Micro Devices, Inc.).

Am79C61X TADTalk™ Device for Digital Telephone Answering Systems, Technical Manual, AMD, pp. 1–1 to 6–3 (Preliminary Draft—10/97).

7.2 Coding of analogue signals by methods other than PCM, 32 kbit/s Adaptive Differential Pulse Code Modulation (ADPCM), *Fascicle III.4* Rec. G.721, pp. 231–268 (Melbourne, 1988).

* cited by examiner

*Primary Examiner*—Duc Nguyen
(74) *Attorney, Agent, or Firm*—Williams, Morgan & Amerson

(57) ABSTRACT

An electronic directory and corresponding communication device is disclosed. The directory includes telecommunications numbers. The directory may further include priority information associated with each number which is used when accessing the directory to facilitate usability. The priority information may include an indication of usage of the communication device corresponding to the directory such that access to the directory is based on usage. The directory may be built up using caller identification information received with incoming calls and may searched to retrieve a desired number.

63 Claims, 6 Drawing Sheets

FIG 6A

| ID | NUMBER | PRIORITY |
|---|---|---|
| Porter, Stan | ###-###-#### | 15 |
| Post, Emily | ###-###-#### | 1 |
| Rogers, Kenny | ###-###-#### | 13 |
| Rowe, Chris | ###-###-#### | 7 |
| Small, William | ###-###-#### | 3 |
| Smith, John | ###-###-#### | 27 |
| Snead, Ron | ###-###-#### | 11 |
| Snyder, Lisa | ###-###-#### | 46 |
| Sommers, Ted | ###-###-#### | 23 |

FIG 6B

| ID | NUMBER | PRIORITY |
|---|---|---|
| Snyder, Lisa | ###-###-#### | 46 |
| Smith, John | ###-###-#### | 27 |
| Sommers, Ted | ###-###-#### | 23 |
| Porter, Stan | ###-###-#### | 15 |
| Rowe, Chris | ###-###-#### | 13 |
| Snead, Ron | ###-###-#### | 11 |
| Rogers, Kenny | ###-###-#### | 7 |
| Small, William | ###-###-#### | 3 |
| Post, Emily | ###-###-#### | 1 |

ELECTRONIC DIRECTORY SYSTEM AND METHOD

BACKGROUND

The present invention is directed to an electronic directory system and method, and more particular, a personalized electronic directory.

The telecommunications industry is expanding rapidly as new types of communication devices are discovered and as new uses for existing communication devices are found. Cordless and cellular phones, for example, have increased the mobility of the telecommunications consumer. The number of personal communication devices such as fax machines and personal computers operating over the telephones lines has also dramatically increased. As the number and type of communication devices used by the typical consumer has increased, the number of telecommunication numbers associated with each individual user has also increased. For example, one individual may have a home phone number, a work phone number, a home fax number, a work fax number, a cellular phone number, and a pager number. As the number of telecommunication numbers associated with a given individual increase, the overall number of telecommunication numbers that must be remembered in order to communicated effectively with that individual are also increased.

In the business environment, a number of directory systems have been developed to provide access to telecommunication numbers needed by the business telecommunications consumer. For example, computer databases are often used to store the names and numbers of people. Access to the database is typically provided to a large number of people via computer networks. The computer used to access the number database may also include a telephonic device, modem and the like, or be interfaced to a telephone in order to dial the number retrieved from the database. Such a database requires substantial effort and time to maintain and update the database and requires each user to have access to a computer.

Another type of directory system often employed in a business environment is a telephone accessible directory. This type of directory is typically part of a private branch exchange (PBX) server. The server is typically used to store names and phone numbers of employees within the business organizations. A telephone is typically used by the user to look-up a desired telephone number by inputting the name of the individual using the alphanumeric correspondence on the telephone keypad. As the number of phone numbers stored on such a directory increase, the directory becomes more difficult to use as large portions of the name to look-up must be entered to get a desired number. The cumbersome nature of the directory is compounded when the typical telephone keypad (e.g. DTMF keys) is used to access the directory because multiple letters are associated with each key.

SUMMARY OF THE INVENTION

Generally, the present invention relates to an electronic telecommunications directory. In one particular embodiment, the directory includes a memory arrangement provided to store directory information. The directory information includes telecommunications numbers and priority information associated with each telecommunications number. A user interface is provided to receive directory access information. A processing unit, coupled to the memory arrangement and the user interface, identifies a particular telecommunications number in response to the directory access information and the priority information.

In accordance with another particular embodiment, a method of storing and retrieving directory information is provided. A plurality of telecommunications numbers are stored in a memory. Priority information is associated with each of the stored telecommunications numbers. Directory access information related to a telecommunications number to be retrieved is received and a sub-set of the telecommunications numbers is identified based on the directory access information. One or more telecommunications numbers are presented to a user based on the associated priority information.

In accordance with another embodiment, a communications device is provided which includes a directory of telecommunications numbers including priority information. The device also includes a processing arrangement which monitors usage of the communication device. In accordance with one particular embodiment of the invention, the priority information is based on the monitored usage.

In accordance with still another embodiment of the invention an electronic directory is provided in a communications device which is configured to communicate with a communication network. The communication device includes a memory arrangement which is provided to store a directory of telecommunications numbers and identification information associated with each of the telecommunications numbers. A call monitor is coupled to receive caller identification information received with an incoming call on the communication network. The caller identification information includes a telecommunications number and corresponding identification information associated with the incoming call. The call monitor is configured to extract the telecommunications number and corresponding identification information associated with the incoming call and to store the extracted telecommunications number and corresponding identification information in the memory arrangement as an entry in the directory. A directory manager is coupled to the memory arrangement and is configured to receive look-up identification information associated with a number to be retrieved from the directory. The directory manager retrieves a directory entry corresponding to the look-up identification information.

In another particular embodiment of the invention a communication device includes a memory arrangement provided to store a directory of telecommunications numbers and identification information associated with each of the telecommunications numbers and a user interface for inputting one or more numbers of a telecommunications number to be called. A directory manager is coupled to the memory arrangement and is configured to retrieve a telecommunications number in the directory of telecommunications numbers which matches the one or more numbers of the number to be called. The directory manager outputs the retrieved number for display to a user. In one embodiment, the device may automatically dial the number in response to input from the user.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 6A–6B are tables illustrating a look-up scheme in accordance with an embodiment of the invention.

Figure 1:
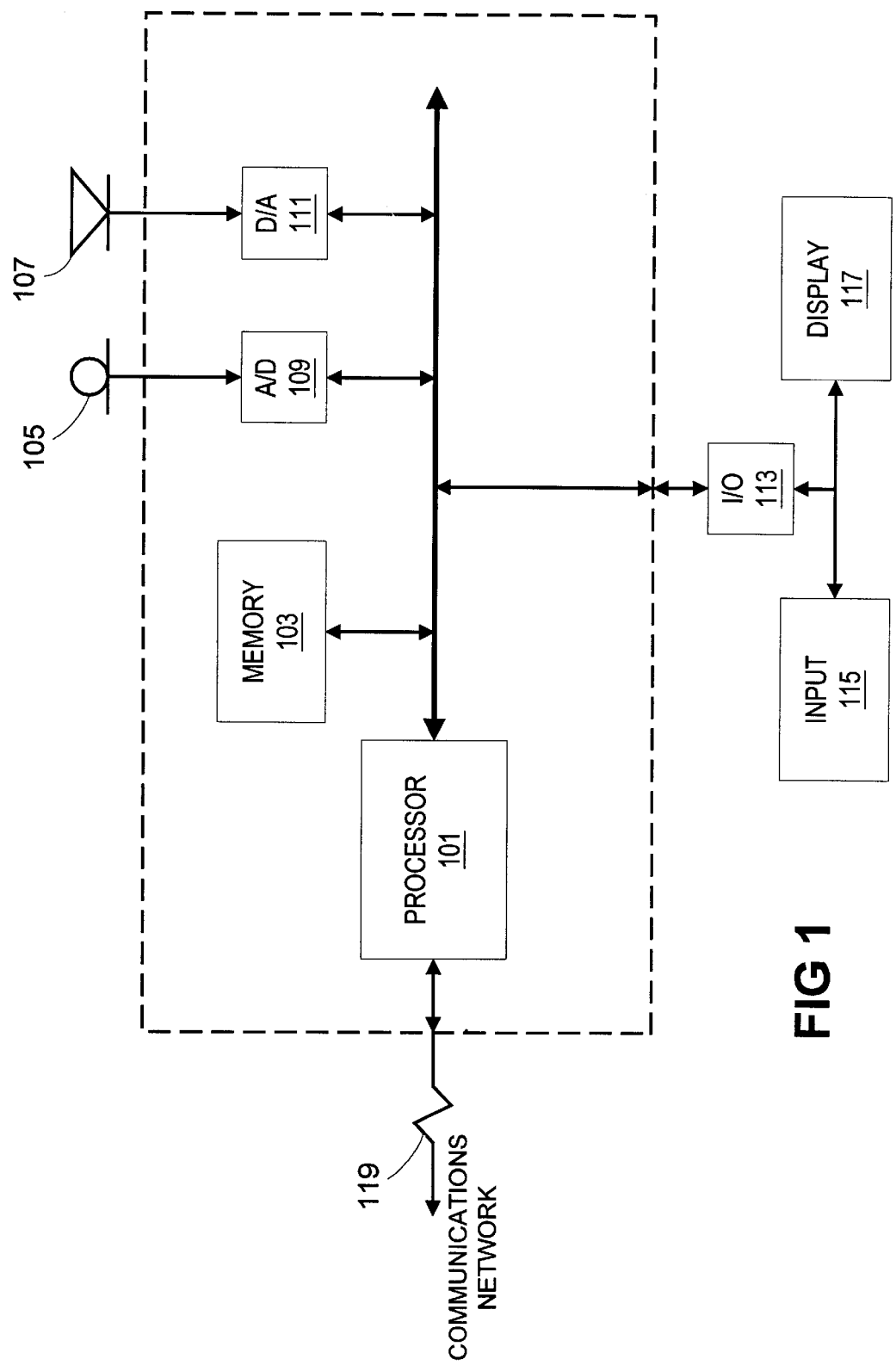
FIG. 1 depicts a communication device in accordance with an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention is believed to be applicable to a variety of communication devices. The invention is particularly suited for use in a number of different communication devices and/or systems where it is possible to monitor usage of the communication device or where provision of an optimized directory is desired. While the present invention is not so limited, an appreciation of various aspects of the invention is best gained through a discussion of various application examples operating in such environments.

FIG. 1 illustrates various components of a communication device in accordance with one particular embodiment of the present invention. The communication device is provided with a directory that is optimized or customized specific to the communication device in which it is implemented or to a user thereof. As will be appreciated from the description of various embodiments provided below, many of the features described could be incorporated into a number of different structures. For example, the components illustrated in FIG. 1 may be provided within a telephone (e.g., wired, cordless, cellular, computer based, etc.), a facsimile machine, an answering machine, a caller ID box and the like. The components may also be divided among any combination of such devices. Thus, references to particular communication devices are generally provided herein for the sake of illustration only without intention to limit the invention to the described example.

The embodiment of FIG. 1, includes a processor 101, a memory arrangement 103, a microphone 105, a speaker 107, analog-to-digital 109 and digital-to-analog 111 converters, an input/output port 113, an input interface 115 and a display 117. The communication device is interfaced to a communication network 119. The processor 101 can be any processor that has sufficient processing power to perform the directory functions implemented in the particular communication device. Most currently available communication devices already have processing capability that meets the processing requirements of one or more of the various functions described below. For example, a typical digital signal processor (DSP) and/or micro-controller found in Caller ID boxes, answering machines, fax machines, cordless phones, cellular phones, and the like, are capable of performing directory functions in accordance with various aspects of the invention. In certain instances more than one processor may be used, for example, when the directory functions are distributed between more than one device.

The memory arrangement 103 is used to store directory information. The memory arrangement may be separate from or incorporated into a processor memory. The size of the memory arrangement 103 is generally dependent on the desired capacity of the directory. In general, the memory arrangement is any type of memory structure which is suitable for use in the manner described below. It may be a single memory or multiple memories which may also be physically separated.

The input device 115 may be any of a number of different devices or various combinations thereof. For example, the communication device may include special directory keys, a standard keyboard operatively connected to the communication device, a built in telephone key pad (e.g., DTMF keypad), or other suitable interface. The display may be any type of display capable of presenting directory information to the user. It should also be appreciated that while a display is used as the output device in the illustrated embodiment, any type of output device may be used. For example, the speaker may be used to audibly present the directory information to the user.

In accordance with one embodiment of the invention, directory may be optimized based on use of the communication device to which it is associated. For the purposes of illustration, a process for building and optimizing such a directory is described in connection with a telephone which is capable of receiving and processing caller specific information. In the particular embodiment below, Caller ID information is used. It should be appreciated, however, that various types of caller specific information received by the communications device could be used. For example, the information could be embedded in the initial training of a fax machine, provided in a control channel of a cellular system, a D channel in an ISDN system, and the like.

Figure 2:
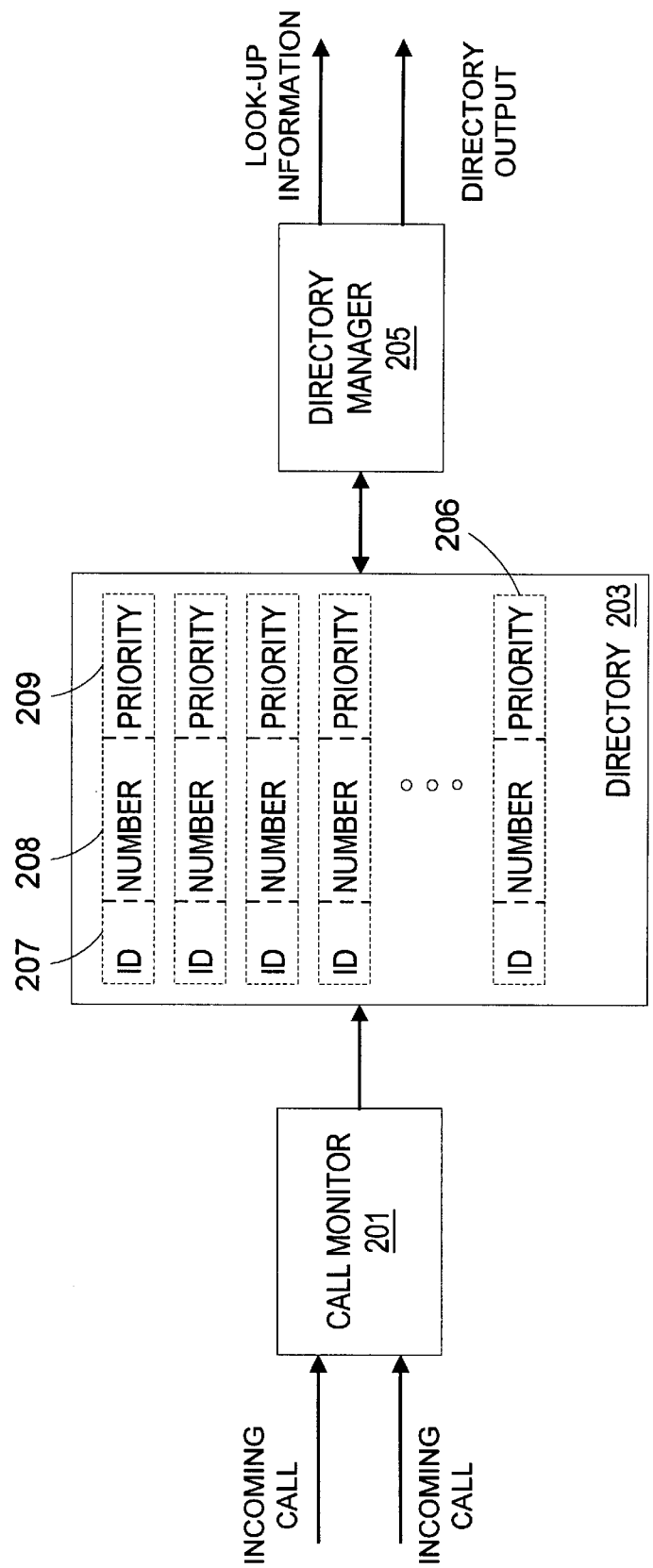
FIG. 2 illustrates a communication device in accordance with another embodiment of the invention.
Figure 3:
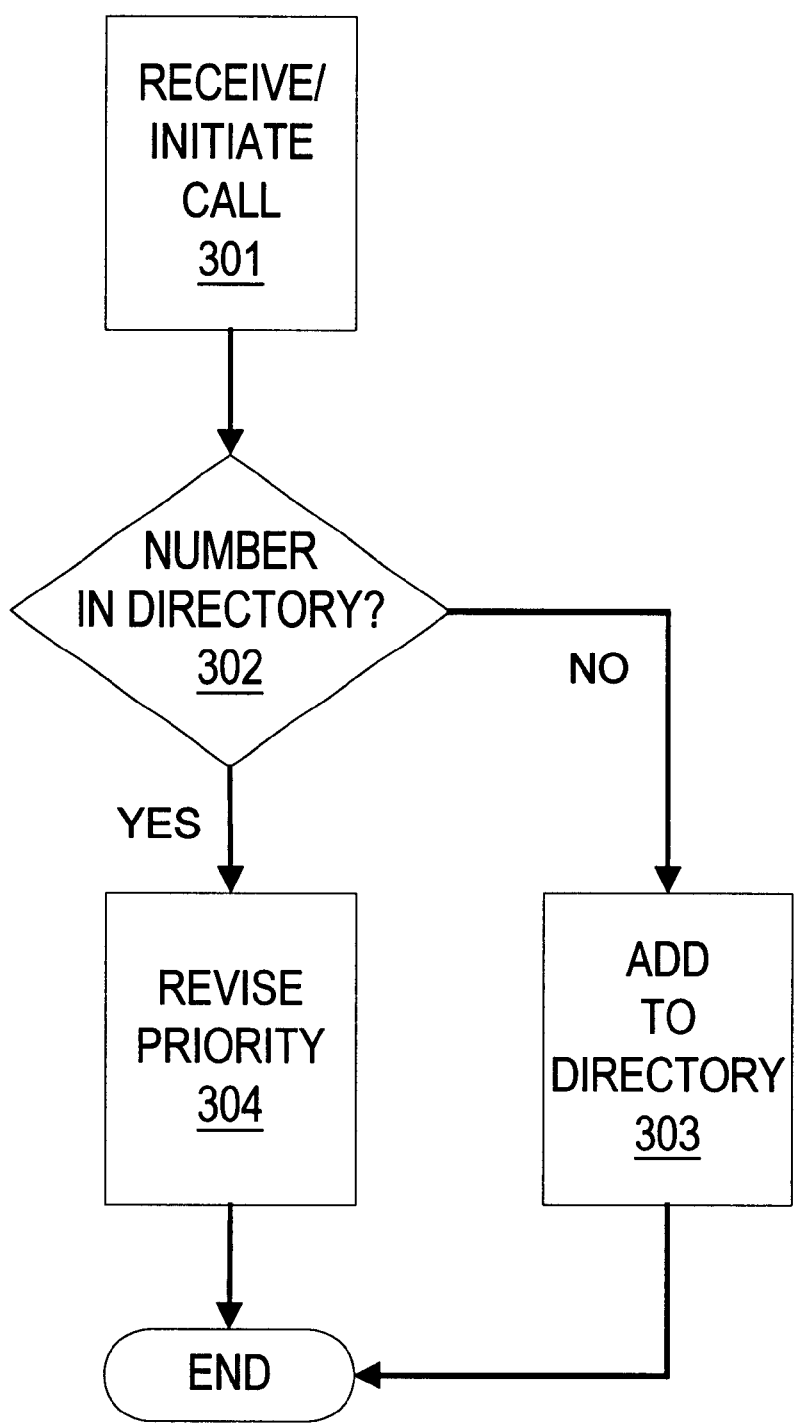
FIG. 3 illustrates an operational flow of various embodiments of the invention.
Figure 4:
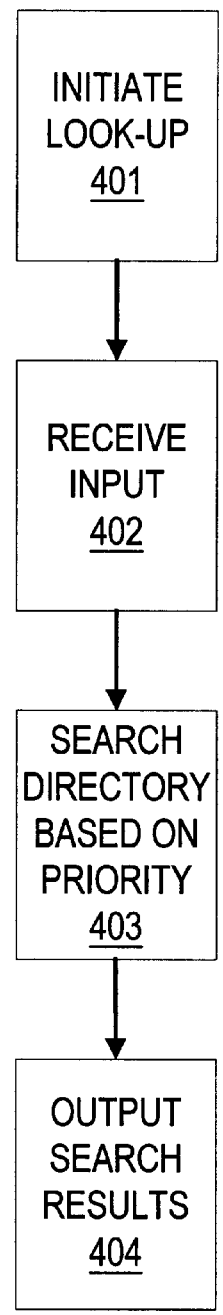
FIG. 4 illustrates another operational flow of various embodiments of the invention.

In the present example, a customized directory is built using Caller ID information and/or information input by the user. This information may be used to build the directory as well as to establish a priority scheme for the directory optimization. A block diagram of one particular embodiment of such a system is illustrated in FIG. 2. The general operation of one such system is illustrated in the flow charts of FIGS. 3 and 4.

When a call is received, the communication device receives Caller ID information (step 301). This information typically includes the caller's name, the caller's telephone number and the time the call was received. The incoming call is received by a call monitor 201 which extracts the Caller ID information. The call monitor 201 has read/write access to a directory 203. The directory 203 stores a plurality of directory entries 206. Each directory entry 206 includes an identification field 207, a telecommunications number field 208 and a priority field 209. It should be appreciated that the illustrated fields are primarily conceptual and may vary depending on the manner in which the directory 203 is stored. The identification field 207 stores information of the type typically used by the user to identify a telecommunications number. For example, the identification field 207 may include the name of a person or company associated with a phone number stored in the telecommunications number field 208. It may also include an indication of the type of telecommunications number (e.g. home phone, cell phone, fax, pager, etc.) stored in the directory entry. The priority field 209 stores information associated with the particular directory entry 209 that may be used by the system to prioritize or optimize information output from the directory 203.

The received Caller ID information may be used by the communication device to search and update the directory 203 (step 302). For example, if the directory does not have a directory entry 206 for a particular caller, the caller's name and number may stored in the directory 203 (step 303). If an entry for the particular caller is already stored in the directory 203, the Caller ID information may be used by the communication device to update the priority field 209 associated with the directory entry 206 for the particular caller (step 304).

The call monitor 201 also monitors outgoing calls. When the user dials a number (step 301), the call monitor 201 searches the directory 307 for the dialed number (step 302) to determine whether the number exists in the directory 203. If the number exists in one of the number fields 208 of the directory 203, the call monitor 201 may be used to update the priority field 209 in the directory entry 206 corresponding to the dialed number (step 304). If the number is not found in the directory, the user may be provided various options and prompts to add the called number to the database (step 303).

A directory manager 205 provides access to the directory 203. Using an input device, a user of the communications device initiates a look-up function. The directory manager 205 is coupled to the directory 203 and may be used to access, add and delete directory entries. The directory manager 205 receives look-up information input from the user (step 401). For example, a user may input information indicating a portion of a name or other identification information in order to retrieve a phone number from the directory 203. The directory manager 205 searches the directory 203 to retrieve directory entries 206 which correspond to the look-up information. The corresponding directory entries 206 are presented to the user in an order determined by the information in the priority field 309 associated with the retrieved directory entries 206 (steps 403 and 404).

As noted above, priority information is associated with each directory entry. The priority data may assume different forms depending upon the desired directory optimization. For example, in one embodiment the priority information includes a value which indicates the number of times a call from a particular number has been received. The priority information may also track the number of times a particular directory entry number has been called by the user of the communication device. As will be appreciated, with this information, the directory may be prioritized to output directory information during a look-up process based the frequency of which a number has been used. In one embodiment of the invention, the user may select a most frequently received call option, a most frequently outgoing call option, or the aggregate most frequently used number (whether incoming or outgoing) as a priority scheme for presenting look-up information. In this manner, the first number presented to a user of the directory is the most frequently used number which satisfies the look-up criteria.

Using the priority information significantly enhances raft the ability to use the directory. When a look-up function is initiated, the first letter of an individual's name, for example, may be input to access the directory. At this point, the highest priority name having that first letter is output. If the output is not the desired individual's name, a second letter may then be entered. In this manner, as the user types more letters for directory access, the output continues to be optimized based on the priority information associated with the directory entries which match the information input by the user. It will be appreciated that depending on the type of output device being used, more than one name may be provided to the user.

In another embodiment, a most recently used prioritization scheme may be used to optimize the directory output. In this instance, time information is associated with each directory entry indicating a time at which the entry number was last used. For example, a time may be extracted from Caller ID information provided with an incoming call. When an outgoing call is dialed, a corresponding time is stored as part of the priority information of the called number. In this manner, each directory entry includes prioritization information indicative of how recent the particular number has been received and/or called.

In the above embodiments, the different types of prioritization schemes can be used collectively or individually. For example, the prioritization scheme may be based solely on the most recent outgoing call, a combination of either outgoing or incoming calls, the most recent incoming call, or a combination of the most recently used numbers and a number of times a particular phone number has been used. In this manner, access to the directory information is optimized based on use of the communication device.

In still another embodiment of the invention, a user may be provided with a number of optional filters to control what information which is placed in the directory. For example, a filter may be provided to prevent unavailable, private or blocked numbers from being entered into the directory. Filtering functions and flexibility may be provided which permit the user to selectively build up the directory with entries as desired. In other embodiments, filter sets could be hard coded by the manufacture of the telephony device. As will be appreciated from the above description, various combinations of two or more functions may be provided within a communication device. In one particular embodiment, the user may set different prioritization schemes based on the desired optimization of the directory.

In accordance with still another embodiment of the invention, the directory may be used to facilitate dialing of outgoing calls. As the phone is dialed, a look-up can be initiated to the directory to search for phone numbers in the directory that correspond to the numbers being dialed. As the numbers are dialed, the directory, based on the priority information, will display the name of the highest priority directory entry corresponding to the portion of the phone number dialed. Since the information displayed may be optimized based on the most frequently called numbers, the most frequently used number corresponding to the first number dialed will be displayed first.

The communication device may also be provided with an interface function which allows the user to autodial the remaining portion of the number once the person being called is displayed. This function allows the user to dial a number, typically without the need of entering all of the numbers in the telephone number. The prioritization serves to further minimize the amount of the phone number which will need to be dialed. Such a function also improves the accuracy of dialing a number since a review of the name from the directory is provided. Moreover, if no name is retrieved from the directory upon dialing a complete number, the user will have an indication that the dialing may have been incorrect.

It will be appreciated, that the directory will be limited to a finite space of memory. In accordance with one embodiment of the invention, the priority information provided within the directory may be used to remove directory entries from the directory in order to free up additional space as need. For example, when the memory gets full, the least frequently used numbers or numbers which have not been used for a given period of time may be deleted from the directory. In this manner, the directory continues to be optimized for the particular use of the communication device without significant maintenance by the user.

In certain embodiments of the invention, as described above, caller information provided with an incoming call may be automatically stored in the directory. This provides the convenience of building up a directory of numbers with little or no work by the user. For example, in an embodiment where the present invention is integrated into a cellular or cordless phone, a call received when the user is not in a position to write down the calling party's number, will be automatically logged into the directory. This directory can further be accessed wherever the phone might be used.

It will be appreciated that in certain instances it may be desirable to provide more than one phone access to a common optimized directory. In a cordless mini-PBX type system, for example, the directory may be placed in the base station, which in turn provides each of the handsets throughout the system with directory access. Each handset may also have its own directory optimized by use of the handset. In one embodiment, each handset may be provided with access to a directory of all incoming calls to the mini-PBX with the common directory being prioritized individually for each handset based on the usage of the handset. Similarly, two-line phones may share common directories with the same or different priority schemes. Numerous variations on the type of priority schemes will be evident upon review of the present application. It will also be evident that the telephony device may provide the user with the ability to select between different priority schemes.

It should also be appreciated that the optimized phone directory functions may be provided in traditional PBX phone directories. For example, a smaller subset of numbers may be built up on the server specific to a particular accessing telephone. This set of directory entries may be optimized for the particular user. In this manner, an optimized directory is provided.

In the various examples provided above, a single telecommunications number is associated with each directory entry. It will be appreciated, however, that the directory database may be more complex. For example, multiple telecommunications numbers may be associated with a particular directory entry. If a particular person has different work, home and cellular phone numbers, each of which are regularly called, it may be desirable to base priority on the aggregate use of each number. Again, such a priority scheme could be selected by the user. The output display may be provided with the capability of displaying more than one number for a given name with a method of choosing one of the displayed numbers.

As noted above, in one embodiment of the invention the directory look-up features may be implemented with the addition of few or no additional user interface keys. This may be accomplished by using the standard DTMF keypad to perform the directory functions. When using the DTMF keypad, the complexity of the directory look-up is increased since each key pressed is typically associated with three or more letters. When using the DTMF keys to search the directory, the search algorithm must be augmented to look for multiple possible responses to the input numbers. This process is illustrated in connection with FIGS. 5, 6A and 6B.

Figure 5:
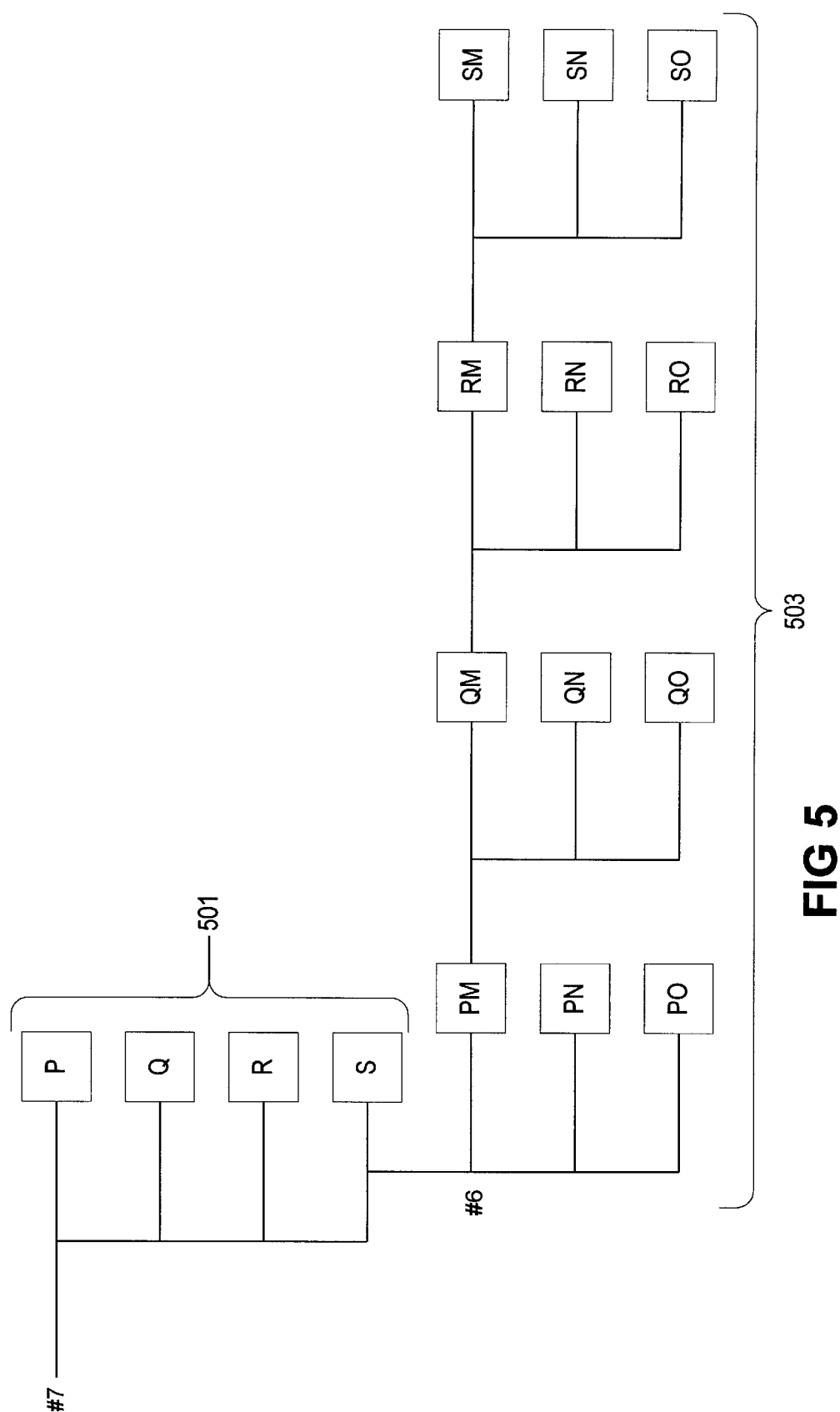
FIG. 5 depicts a DTMF look-up procedure in accordance with one embodiment of the invention.

In the example of FIG. 5, the user has first pressed the DTMF keypad key corresponding to number 7. This would correspond, for example, to a user attempting to look up a person with the last name "Snyder." The look-up algorithm searches for all names that start with any of the letters P,Q,R or S (i.e., letters corresponding to the number 7).

The user next presses the number 6 on the DTMF keypad (corresponding to letters M, N and O) to identify names beginning with the letters SN. This combination of the numbers 7 and 6, however, corresponds to twelve different two-letter combinations, PM, PN, PO, QM, QN, QO, RM, RN, RO, SM, SN, and SO. As will be appreciated, with the entry of only two letters, the number of possible names that may be found in a directory is still quite high.

FIGS. 6A and 6B illustrate a portion of a directory which would correspond to the number entries depicted in FIG. 5. As illustrate in FIG. 6A, by depressing the numbers 7 followed by 6 on the DTMF keypad, a list of nine names are identified within the directory which correspond to the potential letter combinations. Those letter combinations which are bold in FIG. 5, (i.e., PM, PN, PO, QM, QN, QO, RM, RN) do not have corresponding names within the directory. Thus, these combinations can be discarded.

If the directory were not optimized, and the names were presented to the user in an alphabetical order, the names would be viewed in the order depicted in FIG. 6A. As will be appreciated, by only entering two numbers, the user would need to look through eight names to find the entry for "Lisa Snyder," the desired number. As further illustrated in FIGS. 6A and 6B, the directory further includes priority information. The priority information in this embodiment, includes a number indicating the number of times a particular number has been called. In this instance, "Lisa Snyder" is the most frequently called number. Accordingly, in accordance with an embodiment of the invention, with the depression of the numbers 7 and 6 on the DTMF keys, the name "Lisa Snyder" and corresponding number will be output to the user first. As will further be appreciated from the depiction in FIGS. 6A and 6B the user may then sequentially step through the numbers in the order of priority by next viewing the number "John Smith," "Ted Summers,". . . etc. As will be appreciated, the prioritization scheme of the numbers provided within the directory provides enhanced access to the directory using the standard telephone DTMF keypad.

While a priority scheme is used in the above example, it should be appreciated that in certain instances the directory may not need to be prioritized. For example, a personalized directory may be built from Caller ID information, such that the directory is personalized to the telephony device, with directory entries being recalled using an alphabetical name search. Outgoing numbers may also be entered into the directory as described above. In this embodiment, a personalized directory is automatically built up with usage of the telephone with the entries being recalled as desired. A personalized directory may also be searched based on a number being dialed where the numbers are retrieved in a numeric order. When the desired number is displayed, a function may be invoked to automatically dial the displayed number.

As noted above, the present invention is applicable to a number of different communication devices and systems where one or more of the above-described directory functions is desired. Accordingly, the present invention should not be considered limited to the particular examples described above, but rather should be understood to cover all aspects of the invention as fairly set out in the attached claims. Various modifications, equivalent processes as well as numerous communication devices to which the present invention will be applicable will be readily apparent to those of skill in the art upon review of the present specification. The claims are intended to cover such modifications and devices.

I claim:

1. An electronic directory system, comprising:

a memory arrangement configured to store directory information for one or more communications devices, the directory information comprising a plurality of telecommunications numbers and priority information associated with each telecommunications number, wherein the priority information comprises an indication of use of any of the one or more communications devices associated with the directory;

a user interface configured to receive directory access information; and a processing unit coupled to the memory arrangement and the user interface, the processing unit configured to identify a particular telecommunications number in response to the directory access information and the priority information, wherein the processing unit is further configured to remove directory entries from the memory arrangement to free up storage space in the memory arrangement, wherein the directory entries with a lowest priority value are removed before the directory entries with a higher priority value.

2. The system as recited in claim 1, wherein the priority information further comprises an indication of a number of times a call has been received from an associated telecommunications number.

3. The system as recited in claim 1, wherein the priority information further comprises an indication of a number of times the associated telecommunications number has been called.

4. The system as recited in claim 1, further comprising:

one or more filters coupled to the memory arrangement to control which information is placed in the directory information.

5. The system as recited in claim 4, wherein the one or more filters block entry of unavailable, private or blocked telecommunications numbers into the directory information.

6. The system as recited in claim 4, wherein operation of the one or more filters is set during manufacture of the electronic directory structure.

7. The system as recited in claim 4, wherein operation of the one or more filters are controllable by a user.

8. The system as recited in claim 1, wherein the user interface is further configured to facilitate dialing of outgoing calls by searching in the directory information for telecommunications numbers that correspond to digits being dialed, wherein a corresponding telecommunications number is provided through the user interface in response to the digits being dialed and the priority information.

9. The system as recited in claim 8, wherein the user interface is further configured to auto-dial the corresponding telecommunications number in response to a user acceptance of the corresponding telecommunications number.

10. An electronic directory system, comprising:

a memory arrangement configured to store directory information for one or more communications devices, the directory information comprising a plurality of telecommunications numbers and priority information associated with each telecommunications number, wherein the priority information comprises an indication of use of any of the one or more communications devices associated with the directory;

one or more filters coupled to the memory arrangement to control which information is placed in the directory information, wherein the one or more filters block entry of unavailable, private or blocked telecommunications numbers into the directory information;

a user interface provided to receive directory access information; and a processing unit coupled to the memory arrangement and the user interface, the processing unit configured to identify a particular telecommunications number in response to the directory access information and the priority information.

11. The system as recited in claim 10, wherein the priority information further comprises an indication of a number of times a call has been received from an associated telecommunications number.

12. The system as recited in claim 10 wherein the priority information comprises an indication of a number of times the associated telecommunications number has been called.

13. The system as recited in claimed 10 wherein operation of the one or more filters is set during manufacture of the electronic directory structure.

14. The system as recited in claim 10 wherein operation of the one or more filters are controllable by a user.

15. The system as recited in claim 10 wherein the user interface is further configured to facilitate dialing of outgoing calls by searching in the directory information for telecommunications numbers that correspond to digits being dialed, wherein a corresponding telecommunications number is provided through the user interface in response to the digits being dialed and the priority information.

16. The system as recited in claim 15 wherein the user interface is further configured to auto-dial the corresponding telecommunications number in response to a user acceptance of the corresponding telecommunications number.

17. A method of storing and looking up telecommunications directory information, the method comprising:

storing a plurality of telecommunications numbers;

filtering the plurality of telecommunications numbers prior to said storing to block storage of unavailable, private or blocked telecommunications numbers;

monitoring usage, in connection with a particular telecommunications number, of any of one or more communication devices associated with the directory;

associating the priority information with the particular telecommunications number based on the monitored usage;

receiving directory access information related to a telecommunications number to be retrieved;

identifying a sub-set of the telecommunications numbers based on the directory access information; and presenting one or more telecommunications numbers in the sub-set of telecommunications numbers to a user based on the associated priority information.

18. The method as recited in claim 17 wherein the particular telecommunications number is that of an outgoing call, the priority information including an indication of a number of times a call has been initiated using any of the one or more communication devices to the particular telecommunications number.

19. The method as recited in claim 17, wherein the particular telecommunications number is an incoming call with caller identification information, the priority information including an indication of a time a call from the particular telecommunications number was received.

20. The method as recited in claim 17, wherein the particular telecommunications number is an outgoing call, the priority information including an indication of a time at which a call to the particular telecommunications number was made.

21. The method as recited in claim 17, wherein storing the telecommunications numbers comprises receiving telecommunications number information from caller identification information provided with an incoming call.

22. The method as recited in claim 21, wherein the method further includes: storing the identification information associated with the telecommunications number.

23. The method as recited in claim 22, wherein the identification information includes name information received from caller identification information provided with the incoming call.

24. The method as recited in claim 17, wherein associating priority information comprises assigning a number representing a type of communications device associated with the telecommunications number.

25. The method as recited in claim 24, wherein assigning a number representing a type of communications device associated with the telecommunications number comprises assigning a number representing a type of communications device associated with the telecommunications number, wherein the type of communications device is taken from the group consisting of a home voice telephone, a work voice telephone, a mobile phone, a home facsimile machine, a work facsimile machine, and a pager.

26. The method as recited in claim 17, further comprising:
accepting one of the one or more telecommunications numbers presented; and
dialing the one of the one or more telecommunications numbers accepted.

27. The method as recited in claim 17, further comprising:
removing one of the one or more telecommunications numbers and associated priority information to free up storage space based solely on the associated priority information.

28. A method of storing and looking up telecommunications directory information, the method comprising:
storing a plurality of telecommunications numbers;
monitoring usage, in connection with a particular telecommunications number of the plurality of telecommunications numbers, of one or more communication devices associated with the directory;
associating priority information with the particular telecommunications number based on the usage from monitoring usage of the one or more communication devices associated with the directory;
removing one of the one or more telecommunications numbers and associated priority information to free up storage space based solely on the associated priority information;
receiving directory access information related to a telecommunications number to be retrieved from the plurality of telecommunications numbers;
identifying a sub-set of the plurality of telecommunications numbers based on the directory access information; and
presenting one or more telecommunications numbers in the sub-set of the plurality of telecommunications numbers to a user based on the associated priority information.

29. The method as recited in claim 28, herein the particular telecommunications number is that of an outgoing call, the priority information including an indication of a number of times a call has been initiated using the communication device to the particular telecommunications number.

30. The method as recited in claim 28, wherein the particular telecommunications number is an incoming call with caller identification information, the priority information including an indication of a time a call from the particular telecommunications number was received.

31. The method as recited in claim 28, wherein the particular telecommunication s number is an outgoing call, the priority information including an indication of a time at which a call to the particular telecommunications number was made.

32. The method as recited in claim 28, wherein storing the telecommunications numbers comprises receiving telecommunications number information from caller identification information provided with an incoming call.

33. The method as recited in claim 32, wherein the method further includes storing the identification information associated with the telecommunications number.

34. The method as recited in claim 33, wherein the identification information includes name information received from caller identification information provided with the incoming call.

35. The method as recited in claim 28, wherein associating priority information comprises assigning a number representing usage of the telecommunications number.

36. The method as recited in claim 28, further comprising:
accepting one of the one or more telecommunications numbers presented; and
dialing the one of the one or more telecommunications numbers accepted.

37. A communications device configured to communicate with a communications network, the communications device comprising:
a microphone configured to receive audio information;
a speaker configured to output audio information;
a directory configured to store and retrieve directory information including a plurality of numbers, the directory information further including identification information and priority information corresponding to each of the plurality of numbers, wherein the priority information comprises an indication of use of the communications device, and wherein the priority information further comprises an indication of a number of times a call has been received from one of the plurality of numbers;
an interface configured to receive look-up information from a user and to output at least one of the plurality of numbers, in response to receipt of the look-up information, based on the corresponding priority information, wherein the look-up information includes at least one of one or more numbers of a telecommunications number to be called and one or more letters associated with the telecommunications number to be called; and
a processing arrangement configured to monitor usage of the communications device and to update the directory based on the usage, wherein the processing unit is further configured to remove directory entries from the memory arrangement to free up storage space in the memory arrangement, wherein the directory entries with a lowest priority value are removed before the directory entries with a higher priority value.

38. The communications device as recited in claim 37, wherein the priority information comprises an indication of the usage of the communication device in connection with the corresponding number.

39. The communications device as recited in claim 37, wherein the usage of the communication device monitored by the processing arrangement comprises calls received by the communication device from the communication network.

40. The communications device as recited in claim 37, wherein the usage of the communication device monitored by the processing arrangement comprises calls initiated to the communication network from the communication device.

41. The system as recited in claim 37, wherein the priority information further comprises an indication of a number of times the one of the plurality of numbers has been called.

42. The communications device as recited in claim 37, further comprising:
one or more filters coupled to the memory arrangement to control which information is placed in the directory information.

43. The communications device as recited in claim 42, wherein the one or more filters block entry of unavailable, private or blocked telecommunications numbers into the directory information.

44. The communications device as recited in claim 42, wherein operation of the one or more filters is set during manufacture of the electronic directory structure.

45. The communications device as recited in claim 42, wherein operation of the one or more filters are controllable by a user.

46. The communications device as recited in claim 37, wherein the user interface is further configured to facilitate dialing of outgoing calls by searching in the directory information for telecommunications numbers that correspond to digits being dialed, wherein a corresponding telecommunications number is provided through the user interface in response to the digits being dialed and the priority information.

47. The communications device as recited in claim 46, wherein the user interface is further configured to auto-dial the corresponding telecommunications number in response to a user acceptance of the corresponding telecommunications number.

48. The communications device as recited in claim 37, wherein the processing unit is further configured to monitor usage of one or more additional communications devices and further to update the directory based on the usage of the one or more additional communications devices.

49. A communications system configured to communicate with a communications network, the communications system comprising:
a base station, comprising:
a directory configured to store and retrieve directory information including a plurality of numbers, the directory information further including identification information and priority information corresponding to each of the plurality of numbers, wherein the priority information comprises an indication of use of the communications device, and wherein the priority information further comprises an indication of a number of times a call has been received from one of the plurality of numbers; and
a processing arrangement configured to monitor usage of the communication system and to update the directory based on the usage; and
one or more handset units, wherein each of the one or more handset units comprises:
a microphone configured to receive audio information;
a speaker configured to output audio information; and
a user interface configured to receive look-up information from a user and to query the directory in the base station to output at least one of the plurality of numbers, in response to receipt of the look-up information, based on the corresponding priority information, wherein the look-up information includes at least one of one or more numbers of a telecommunications number to be called and one or more letters associated with the telecommunications number to be called;
wherein each of the one or more handset units is configured to communicate usage to the processing arrangement.

50. The system as recited in claim 49, wherein the priority information comprises an indication of the usage of a particular handset unit of the one or more handset units in connection with the corresponding number.

51. The system as recited in claim 49, wherein the usage of the communication system monitored by the processing arrangement comprises calls received by a particular handset unit of the one or more handset units from the communication network.

52. The system as recited in claim 49, wherein the usage of the communication system monitored by the processing arrangement comprises calls initiated to the communication network from a particular handset unit of the one or more handset units.

53. The system as recited in claim 49, wherein the directory is optimized for use by each of the one or more handset units based on individual usage.

54. The system as recited in claim 49, wherein the one or more handset units includes a plurality of handset units, wherein the directory is optimized for use by each of the one or more handset units based on combined usage of the plurality of handset units.

55. The system as recited in claim 49, wherein the base station further comprising:
one or more filters coupled to the memory arrangement to control which information is placed in the directory.

56. The system as recited in claim 55, wherein the one or more filters block entry of unavailable, private or blocked telecommunications numbers into the directory.

57. The system as recited in claim 55, wherein operation of the one or more filters is set during manufacture of the base station.

58. The system as recited in claim 55, wherein operation of the one or more filters is controllable by a user of each of the one or more hand set units.

59. The system as recited in claim 49, wherein the user interface is further configured to facilitate dialing of outgoing calls by searching in the directory information for telecommunications numbers that correspond to digits being dialed, wherein a corresponding telecommunications number is provided through the user interface in response to the digits being dialed and the priority information.

60. The system as recited in claim 59, wherein the user interface is further configured to auto-dial the corresponding telecommunications number in response to user acceptance of the corresponding telecommunications number.

61. The system as recited in claim 49, wherein the directory is further configured to remove directory information to free up storage space in the directory, wherein the directory information with a lowest priority value is removed before the directory information with a higher priority value.

62. A system, comprising:

means for storing a plurality of telecommunications numbers;

means for filtering the plurality of telecommunications numbers prior to storing one of the plurality of telecommunications numbers to block storage of unavailable, private or blocked telecommunications numbers;

means for monitoring usage, in connection with a particular telecommunications number, of any of one or more communication devices associated with the means for storing the plurality of telecommunications numbers;

means for associating the priority information with the particular telecommunications number based on the monitored usage;

means for receiving directory access information related to a telecommunications number to be retrieved;

means for identifying a sub-set of the telecommunications numbers based on the directory access information; and means for presenting one or more telecommunications numbers in the sub-set of telecommunications numbers to a user based on the associated priority information.

63. A system, comprising:

means for storing a plurality of telecommunications numbers;

means for monitoring usage, in connection with a particular telecommunications number of the plurality of telecommunications numbers, of one or more communication devices associated with the means for storing the plurality of telecommunications numbers;

means for associating priority information with the particular telecommunications number based on the usage from monitoring usage of the one or more communication devices associated with the means for storing the plurality of telecommunications numbers;

means for removing one of the one or more telecommunications numbers and associated priority information to free up storage space based solely on the associated priority information;

means for receiving directory access information related to a telecommunications number to be retrieved from the plurality of telecommunications numbers;

means for identifying a sub-set of the plurality of telecommunications numbers based on the directory access information; and means for presenting one or more telecommunications numbers in the sub-set of the plurality of telecommunications numbers to a user based on the associated priority information.

* * * * *